No. 687,315. Patented Nov. 26, 1901.
F. E. KEYES.
PIE JUICE SAVER.
(Application filed July 22, 1901.)
(No Model.)
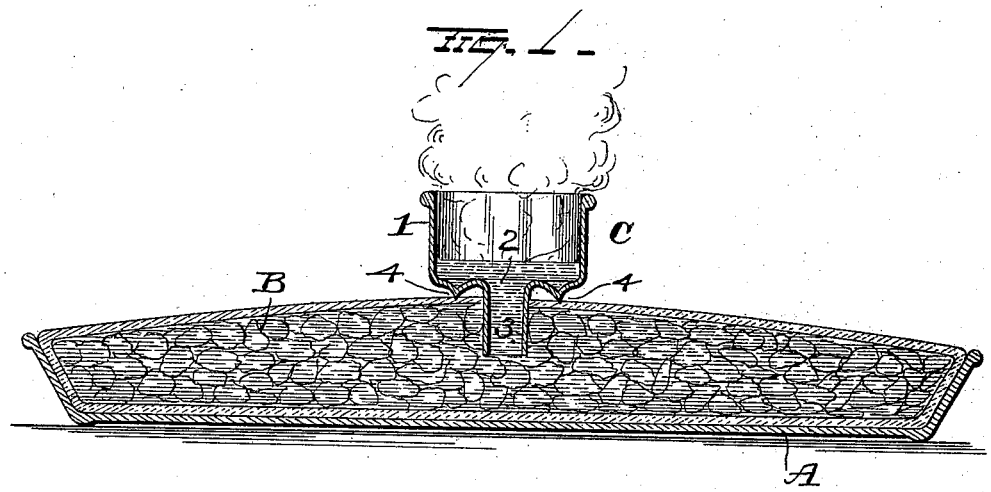
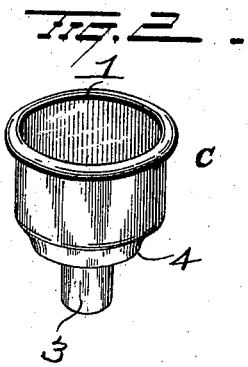
WITNESSES
INVENTOR
F. E. Keyes
Attorney

UNITED STATES PATENT OFFICE.

FRANK EUGENE KEYES, OF HOLYOKE, MASSACHUSETTS.

PIE-JUICE SAVER.

SPECIFICATION forming part of Letters Patent No. 687,315, dated November 26, 1901.

Application filed July 22, 1901. Serial No. 69,290. (No model.)

*To all whom it may concern:*

Be it known that I, FRANK EUGENE KEYES, a resident of Holyoke, in the county of Hampden and State of Massachusetts, have invented certain new and useful Improvements in Pie-Juice Savers; and I do hereby declare the following to be a full, clear, and exact description of the invention, such as will enable others skilled in the art to which it appertains to make and use the same.

My invention relates to an improvement in pie-juice savers, the object of the invention being to produce a simple and efficient device by means of which juice will be effectually prevented from escaping from the pie while the same is being cooked.

With this object in view the invention consists in certain novel features of construction and combinations and arrangements of parts, as hereinafter set forth, and pointed out in the claims.

In the accompanying drawings, Figure 1 is a transverse sectional view of a pie, showing the application of my improved juice-saver thereto. Fig. 2 is a perspective view of the device.

A represents a pie-plate and B the pie therein, and C represents my improved juice-saver. The device C may be made of aluminium or other suitable material and comprises a cup-shaped body 1, having a hole 2 in the center of its bottom. A short tube 3 depends from the bottom of the cup 1 and communicates with the hole 2, said tube being intended to project into the contents of the pie, as shown in Fig. 1. The bottom of the cup is also provided with an annular packing flange or rib 4, which when the device is applied to a pie becomes seated in the crust thereof (partially penetrating the same) and prevents the oozing of any juice which might otherwise escape through the hole in the pie provided for the passage of the tube 3. It is a matter of common knowledge with bakers that when a hole is made in the dough which is to form the top crust of the pie such hole becomes enlarged during the process of cooking. This would be liable to happen with the hole through which the tube 3 passes if it were not for the packing-ring 4; but this packing ring or flange serves to prevent the undue enlargement of the hole in the crust and also to prevent the escape of juice should the said hole become slightly enlarged. With my device juice will escape from the pie during cooking through the tube 3 and into the cup 1; but as soon as the pie is removed from the oven and permitted to cool the juice will promptly flow from the cup back into the pie, and thus it will be seen that the pie will not be deprived of a particle of its juice. Slight changes might be made in the details of the device without departing from the spirit of my invention or limiting its scope, and hence I do not wish to limit myself to the precise shape and dimensions shown.

Having fully described my invention, what I claim as new, and desire to secure by Letters Patent, is—

1. A juice-saver for pies comprising a cup, a tube depending therefrom and a packing-ring on the bottom of the cup and adapted to engage the pie around said tube.

2. A juice-saver for pies comprising a cup, a tube depending from the center of the bottom thereof, and an annular flange on the bottom of the cup and spaced from said tube, said annular flange adapted to engage the top of the pie and act as a packing-ring to prevent the escape of juice through the hole in the pie through which the tube passes.

In testimony whereof I have signed this specification in the presence of two subscribing witnesses.

FRANK EUGENE KEYES.

Witnesses:
 GEO. T. STODDARD,
 I. N. LEARNED.